United States Patent [19]

Kandler et al.

[11] 3,758,671
[45] Sept. 11, 1973

[54] PRODUCTION OF POLYPHOSPHATE HYDRATED TO AN EXTENT OF MORE THAN 75% AND HAVING AN APPARENT DENSITY OF BETWEEN 400 AND 600 GRAMS/LITER

[75] Inventors: Joachim Kandler, Lechenich; Karl Merkenich, Efferen; Klaus Henning, Hurth; Wolf-Dieter Pirig, Euskirchen, all of Germany

[73] Assignee: Knapsack Aktiengesellschaft, Knapsack near Cologne, Germany

[22] Filed: Aug. 9, 1971

[21] Appl. No.: 170,306

[30] Foreign Application Priority Data
Aug. 10, 1970 Germany.................. P 20 39 595.3

[52] U.S. Cl. ............................................ 423/315
[51] Int. Cl. ...................... C01b 15/16, C01b 25/26
[58] Field of Search................. 23/106, 106 D, 107; 423/315

[56] References Cited
UNITED STATES PATENTS 3,672,826  6/1970  Hornig et al........................ 23/106
3,469,938  9/1969  McLeod et al. ..................... 23/107
3,309,174  3/1967  Pals...................................... 23/107

FOREIGN PATENTS OR APPLICATIONS
252,189  2/1967  Austria .............................. 23/106

Primary Examiner—Oscar R. Vertiz
Assistant Examiner—Gregory A. Heller
Attorney—Arthur G. Connolly et al.

[57] ABSTRACT

Production of sodium tripolyphosphate hydrated to an extent of more than 75 percent and with an apparent density of between 400 and 600 grams/liter by spraying water on to phase-I-containing sodium tripolyphosphate pneumatically maintained in suspension in a reactor and flowing a stream of gas through the reactor so as to dissipate reaction heat in excess. More particularly, sodium tripolyphosphate with an apparent density of more than 800 grams/liter and containing between 50 and 80 percent of phase-I, is fluidized by flowing a stream of gas through the reactor, countercurrently with respect to the sodium tripolyphosphate.

4 Claims, No Drawings

PRODUCTION OF POLYPHOSPHATE HYDRATED TO AN EXTENT OF MORE THAN 75% AND HAVING AN APPARENT DENSITY OF BETWEEN 400 AND 600 GRAMS/LITER

The present invention relates to a process for the manufacture of sodium tripolyphosphate — briefly termed STPP hereinafter — hydrated to an extent of more than 75 percent and having an apparent density of between 400 and 600 grams/liter by spraying water on to phase-I-containing STPP pneumatically maintained in suspension in a reactor, and flowing a stream of gas through the reactor, for the abstraction of reaction heat in excess.

It has already been reported earlier that STPP-hexahydrate with an apparent density of between 350 and 1,000 grams/liter can be produced by spraying an overstoichiometric proportion of water on to anhydrous STPP maintained under agitation and simultaneously flowing a stream of gas over the reaction material so as to evaporate water in excess, the water in excess and gas stream being so balanced against one another that the latent heat of evaporation of the water be sufficient to maintain the reaction material at a temperature of between about 50° and 80°C. The water is more particularly sprayed on to STPP, which is conveyed through a rotary tube, for example, or fluidized. To increase the reaction velocity, it has been suggested that starting material with an increased proportion of phase-I therein be used.

In this process, the resulting product can be packed and stored only after completion of the hydration reaction. Failing this, the individual particles are subject to undesirable caking because of post-reaction phenomena. It is therefore good practice to effect the hydration in a vented rotary drum or in a fluidized bed, and successively to allow the material to remain for some time, for example, 30 minutes, in a further heat-insulated rotary tube. Only then can the material be placed in bags. The apparent density of the hexahydrate so made is a direct function of the apparent density of the anhydrous starting material of which the hollow ball structure is preserved in this process. On the other hand, if use is made of ground material, i.e. heavy material, with an apparent density of 1,000 grams/liter, it is only natural that heavy STPP-hexahydrate is obtained, in this process.

It has also been described earlier that detergents containing STPP as their principal constituent in combination with customary detergent components, such as liquid or pasty surface-active substances, soap, perborate, silicates, sodium sulfate, cellulose ether and similar compounds, can be produced by spraying the liquid detergent components, primarily water, on to STPP containing between 20 and 100 percent of phase-I and having an apparent density higher than 550 grams/liter, in a fluidized air mixer. This spray step effects the formation of STPP-hexahydrate and flowable detergents having an apparent density lower than that of the STPP-starting material are obtained. If use is made of STPP with an apparent density of more than 600 grams/liter, the resulting detergents normally have an apparent density of between 400 and 500 grams/liter.

The present invention now unexpectedly provides a process for the manufacture of STPP hydrated to an extent of more than 75 percent and with an apparent density of between 400 and 600 grams/liter by spraying water on to phase-I-containing STPP pneumatically maintained in suspension in a reactor and flowing a stream of gas through the reactor so as to dissipate reaction heat in excess, which process comprises using STPP, preferably ground STPP, with an apparent density of more than 800 grams/liter and containing between 50 and 80 percent of phase-I, and fluidizing the STPP by flowing a stream of gas through the reactor, countercurrently with respect to the STPP.

The desirable degree of hydration of between 75 and 100 percent is produced by spraying a quantity of water, equivalent to the degree of hydration, on to STPP. This result is more particularly produced if use is made of a fluidized air mixer, preferably of a fluidized air mixer such as that described earlier in German Patent 1,294,352.

Despite this state of the prior art, it was in no way obvious for one skilled in this art to try the steps disclosed in the present invention for the manufacture of the present products. This in view of the fact that a plurality of steps are required to be taken in conventional processes for making STPP-hexahydrate so as to obtain flowable hexahydrate material and avoid hydrolytic splitting, whereby the tripolyphosphate content would be reduced. On the other hand, it is possible, for the production of detergents in a fluidized air mixer, to use completely hydrated STPP with the resultant formation of a detergent having an apparent density lower than that of the starting material, but this in combination with specific light weight builders or fillers having an apparent density of between about 100 and 500 grams/liter, such as light weight sodium silicate, sodium perborate or sodium sulfate. Still further, the liquid or liquefied surface-active substances, which are sprayed together with the hydration water, produce a rather considerable granulation or agglomeration effect, whereby the apparent density is further reduced. In the process of the present invention, however, the starting material is ground STPP with an extremely high apparent density of 1,000 grams/liter, for example. Despite this, it is merely necessary in the present process to add water with the resultant formation of a flowable hexahydrate granulate having an apparent density of 500 grams/liter, for example.

The STPP-hexahydrate coming from the reactor consists of agglomerated or granulated particles and has a low apparent density. It may immediately be placed in bags, for example, without caking or adhering together. While the packed material undergoes a very slight temperature increase, the fact remains that this does not effect the formation of undesirable lumps. The structure of the hexahydrate approaching that of a granulate or agglomerate is likely to avoid this. A critical temperature increase in the reactor and hydrolysis are avoided by the continuous abstraction of the heat of reaction set free during the reaction. As a result, the final product contains all the tripolyphosphate used as starting material. We have further discovered that the apparent density of the final product is unexpectedly also reduced if use is made of a quantity of water which ensures the formation of STPP hydrated merely to an extent of between 75 and 100 percent, rather than the formation of completely hydrated STPP-hexahydrate. STPP hydrated to such an extent also does not tend to adhere or cake together and may immediately be placed in sealable containers.

A further beneficial effect of the process of the present invention resides in the fact that light weight STPP with an apparent density of between 400 and 600 grams/liter is obtained, and this independently of the apparent density and particle size of the tripolyphosphate starting material, by the use of heavy weight STPP with an apparent density of more than 800 grams/liter. Useful starting material is easy to produce by subjecting material, which is obtained in the production of STPP and inhomogeneous with respect to apparent density, to grinding. The only requirement which the starting material has to meet is a high phase-I content. It is this property which is so beneficial firstly in view of the fact that the apparent density of light weight, i.e. bead-shaped STPP can be varied within certain limits only, conditional upon the process used for making the STPP, and secondly in view of the fact that the beads are subject to abrasion or grinding phenomena during transport or storage, whereby the apparent density is more or less increased.

The following Examples further illustrate the process of the present invention.

EXAMPLE 1 (Comparative Example)

A fluidized air mixer was fed with 77.3 weight percent, based on the finished granulate, of anhydrous, readily flowable STPP, which contained 70 percent of phase-I, had an apparent density of 490 grams/liter, and was maintained in suspension by means of a stream of air that travelled vertically upwardly in the mixer. The STPP was hydrated and granulated by spraying water thereonto. The quantity of spray water was empirically varied and STPP hydrated to 100 percent (hexahydrate) was produced. The resulting product leaving the fluidized air mixer had a granular structure and a good stability. It was immediately placed in bags and stored. The granulate had an apparent density of 500 grams/liter.

EXAMPLE 2

A fluidized air mixer was fed with 77.3 weight percent, based on the finished granulate, of anhydrous, readily flowable STPP, which contained 70 percent of phase-I, had an apparent density of 1010 grams/liter, and was maintained in suspension by means of a stream of air that travelled vertically upwardly in the mixer. The STPP was hydrated and granulated by spraying water thereonto. The quantity of spray water was empirically varied and STPP hydrated to 100 percent was produced. The resulting product leaving the fluidized air mixer had a granular structure and a good stability. It was immediately placed in bags and stored. The granulate had an apparent density of 510 grams/liter.

EXAMPLE 3

The procedure was the same as that described in Example 2, save that 79.5 weight percent, based on the finished granulate, of STPP of the above specification were used and save that the spray water was used in a quantity which ensured a 90 percent hydration. The resulting product leaving the fluidized air mixer had a granular structure and a good stability. It was immediately placed in sealed bags and stored. The granulate had an apparent density of 560 grams/liter.

EXAMPLE 4

The procedure was the same as that described in Example 2, save that 82.3 weight percent, based on the finished granulate, of STPP of the above specification were used and save that the spray water was used in a quantity which ensured a 78 percent hydration. The resulting product leaving the fluidized air mixer had a granular structure and a good stability. It was immediately placed in sealed bags and stored. The granulate had an apparent density of 545 grams/liter.

The particle size distribution in the granulates of Examples 1 to 4 was determined by sieve analysis. The results obtained together with further analytical results and further characteristic data are indicated in the following Table.

The STPP-hexahydrate granulates of Examples 1 to 4 were placed in sealed containers, stored over 2 weeks and evaluated. They were all found to combine very good flowability with non-caking and non-adhering properties.

TABLE

| Example number | Apparent density of STPP starting material, grams/liter | Particle size (in percent) of starting material | | | | Temperature in °C. | | |
|---|---|---|---|---|---|---|---|---|
| | | 35 mesh | 100 mesh | 200 mesh | 270 mesh | Fluidized air mixer | Container | Outside |
| 1 | 490 | 22 | 78 | 96 | 99 | 13 | 56 | 6 |
| 2 | 1,010 | 0.3 | 26 | 61 | 78 | 13 | 56 | 6 |
| 3 | 1,010 | 0.3 | 26 | 61 | 78 | 13 | 57 | 6 |
| 4 | 1,010 | 0.3 | 26 | 61 | 78 | 13 | 58 | 6 |

| Example number | Final product | | Sieve analysis percent of granulate | | | | | |
|---|---|---|---|---|---|---|---|---|
| | Water in wt. percent | Apparent density in grams/liter | 12 mesh | 20 mesh | 35 mesh | 65 mesh | 100 mesh | <100 mesh |
| 1 | 22.8 | 500 | 1.0 | 9.2 | 63.4 | 90.7 | 94.1 | 5.9 |
| 2 | 22.9 | 510 | 0.6 | 8.3 | 58.3 | 88.1 | 93.7 | 6.3 |
| 3 | 20.5 | 560 | 2.5 | 22.4 | 71.0 | 92.3 | 94.3 | 5.7 |
| 4 | 17.7 | 545 | 2.8 | 23.2 | 81.1 | 92.5 | 96.1 | 3.1 |

We claim:

1. A process for converting anhydrous sodium tripolyphosphate having a high apparent density to hydrated sodium tripolyphosphate having a decreased apparent density by spraying water onto the said high density feed product which comprises fluidizing anhydrous sodium tripolyphosphate having an apparent density of more than 800 grams/l and containing between 50 and 80 percent phase I by flowing a stream of gas countercurrently with respect to the feed product and spraying the water onto the fluidized sodium tripolyphosphate in an amount equivalent to the degree of hydration of the sodium tripolyphosphate of more than 75 percent with the resultant formation of a sodium tripolyphosphate having an apparent density of between 400 and 600 grams/l and being hydrated to more than 75 percent.

2. The process as claimed in claim 1, wherein the sodium tripolyphosphate is fluidized by air mixing.

3. The process as claimed in claim 1, wherein ground sodium tripolyphosphate is used.

4. The process as claimed in claim 1, wherein a quantity of water equivalent to the degree of hydration of between 75 and 100 percent is sprayed on to the sodium tripolyphosphate.

* * * * *